US012587404B2

(12) United States Patent
Mishra et al.

(10) Patent No.: US 12,587,404 B2
(45) Date of Patent: Mar. 24, 2026

(54) FLOOD OPTIMIZATION TO DISTRIBUTE MULTIHOME SOURCE INFORMATION IN NETWORK

(71) Applicant: Cisco Technology, Inc., San Jose, CA (US)

(72) Inventors: Mankamana Prasad Mishra, San Jose, CA (US); Vinish Ramachandran, Bengaluru (IN); Sridhar Santhanam, Sunnyvale, CA (US); Peter Psenak, Bratislava (SK)

(73) Assignee: CISCO TECHNOLOGY, INC., San Jose, CA (US)

( * ) Notice: Subject to any disclaimer, the term of this patent is extended or adjusted under 35 U.S.C. 154(b) by 532 days.

(21) Appl. No.: 18/193,282

(22) Filed: Mar. 30, 2023

(65) Prior Publication Data

US 2024/0333547 A1     Oct. 3, 2024

(51) Int. Cl.
| | |
|---|---|
| *H04L 12/18* | (2006.01) |
| *H04L 45/00* | (2022.01) |
| *H04L 45/17* | (2022.01) |

(52) U.S. Cl.
CPC ............ *H04L 12/185* (2013.01); *H04L 45/17* (2022.05); *H04L 45/32* (2013.01)

(58) Field of Classification Search
None
See application file for complete search history.

(56) References Cited

U.S. PATENT DOCUMENTS

| | | | |
|---|---|---|---|
| 2010/0067528 A1 | 3/2010 | Napierala | |
| 2018/0034648 A1* | 2/2018 | Nagarajan | H04L 12/462 |
| 2018/0287946 A1* | 10/2018 | Nagarajan | H04L 12/1877 |
| 2019/0014033 A1 | 1/2019 | Keesara et al. | |
| 2020/0287737 A1 | 9/2020 | Mishra et al. | |
| 2021/0014159 A1 | 1/2021 | Mishra et al. | |
| 2021/0099400 A1 | 4/2021 | Elizabeth et al. | |

OTHER PUBLICATIONS

Wijnands, et al., "PIM Flooding Mechanism (PFM) and Source Discovery (SD)," Internet Engineering Task Force (IETF), Request for Comments: 8364, Mar. 2018, 18 pages.

* cited by examiner

*Primary Examiner* — Anh Ngoc M Nguyen
(74) *Attorney, Agent, or Firm* — Edell, Shapiro & Finnan, LLC

(57) ABSTRACT

A method comprises, at routers of a network configured to provide connectivity from a multicast receiver to edge routers multihomed to a multicast source of multicast traffic on an Ethernet segment: creating a limited flood domain for the Ethernet segment, wherein the limited flood domain includes boundary routers positioned to make a final decision as to which of the edge routers to send a multicast join for the multicast traffic; by the boundary routers, upon receiving a source announcement that announces the multicast source is active on a particular edge router of the Ethernet segment, locally storing information, provided by the source announcement, which includes a multicast address for the multicast source and identifies a link to the particular edge router; and by boundary router of the boundary routers, upon receiving the multicast join, sending the multicast join to the particular edge router using the multicast address and the link.

20 Claims, 7 Drawing Sheets

Figure 2:
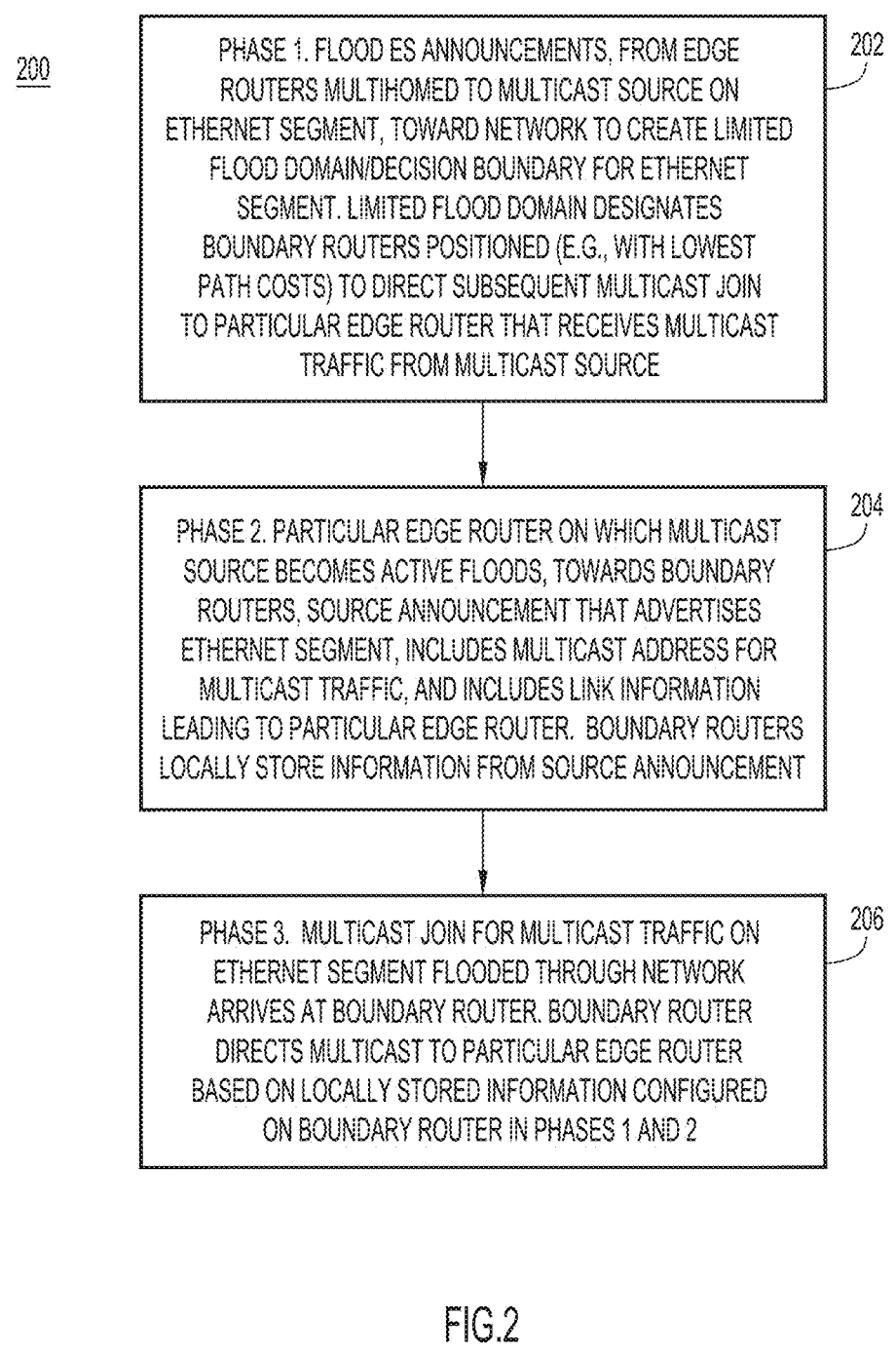

200

PHASE 1. FLOOD ES ANNOUNCEMENTS, FROM EDGE
ROUTERS MULTIHOMED TO MULTICAST SOURCE ON
ETHERNET SEGMENT, TOWARD NETWORK TO CREATE LIMITED
FLOOD DOMAIN/DECISION BOUNDARY FOR ETHERNET
SEGMENT. LIMITED FLOOD DOMAIN DESIGNATES
BOUNDARY ROUTERS POSITIONED (E.G., WITH LOWEST
PATH COSTS) TO DIRECT SUBSEQUENT MULTICAST JOIN
TO PARTICULAR EDGE ROUTER THAT RECEIVES MULTICAST
TRAFFIC FROM MULTICAST SOURCE

202

PHASE 2. PARTICULAR EDGE ROUTER ON WHICH MULTICAST
SOURCE BECOMES ACTIVE FLOODS, TOWARDS BOUNDARY
ROUTERS, SOURCE ANNOUNCEMENT THAT ADVERTISES
ETHERNET SEGMENT, INCLUDES MULTICAST ADDRESS FOR
MULTICAST TRAFFIC, AND INCLUDES LINK INFORMATION
LEADING TO PARTICULAR EDGE ROUTER. BOUNDARY ROUTERS
LOCALLY STORE INFORMATION FROM SOURCE ANNOUNCEMENT

204

PHASE 3. MULTICAST JOIN FOR MULTICAST TRAFFIC ON
ETHERNET SEGMENT FLOODED THROUGH NETWORK
ARRIVES AT BOUNDARY ROUTER. BOUNDARY ROUTER
DIRECTS MULTICAST TO PARTICULAR EDGE ROUTER
BASED ON LOCALLY STORED INFORMATION CONFIGURED
ON BOUNDARY ROUTER IN PHASES 1 AND 2

| |
|---|
| MESSAGE TYPE = SOURCE ANNOUNCEMENT |
| ESI |
| ROUTER ADDRESS |
| MULTICAST ADDRESS (S, G) |
| SPECIFIC/EXACT LINK INFORMATION |

502

504

506

508

510

600

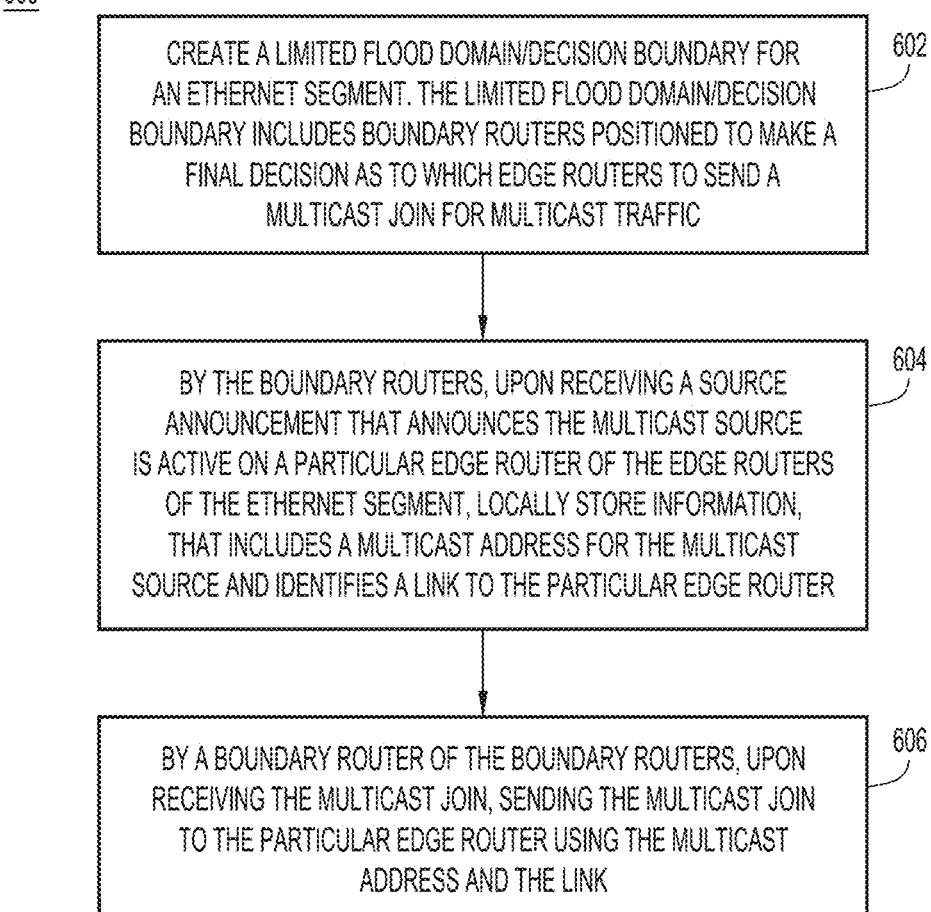

CREATE A LIMITED FLOOD DOMAIN/DECISION BOUNDARY FOR AN ETHERNET SEGMENT. THE LIMITED FLOOD DOMAIN/DECISION BOUNDARY INCLUDES BOUNDARY ROUTERS POSITIONED TO MAKE A FINAL DECISION AS TO WHICH EDGE ROUTERS TO SEND A MULTICAST JOIN FOR MULTICAST TRAFFIC
602

BY THE BOUNDARY ROUTERS, UPON RECEIVING A SOURCE ANNOUNCEMENT THAT ANNOUNCES THE MULTICAST SOURCE IS ACTIVE ON A PARTICULAR EDGE ROUTER OF THE EDGE ROUTERS OF THE ETHERNET SEGMENT, LOCALLY STORE INFORMATION, THAT INCLUDES A MULTICAST ADDRESS FOR THE MULTICAST SOURCE AND IDENTIFIES A LINK TO THE PARTICULAR EDGE ROUTER
604

BY A BOUNDARY ROUTER OF THE BOUNDARY ROUTERS, UPON RECEIVING THE MULTICAST JOIN, SENDING THE MULTICAST JOIN TO THE PARTICULAR EDGE ROUTER USING THE MULTICAST ADDRESS AND THE LINK
606

FIG.6

FLOOD OPTIMIZATION TO DISTRIBUTE MULTIHOME SOURCE INFORMATION IN NETWORK

TECHNICAL FIELD

The present disclosure relates generally to techniques for improved flooding of multicast source information in networks with multihomed provider edges.

BACKGROUND

A protocol independent multicast (PIM) network may be configured in a leaf-spine topology. In a scenario in which a PIM join to receive multicast traffic is sent from a last hop router into the network, the PIM join may reach a first hop router (also referred to as an "edge router" or a "provider edge (PE)") of the PIM network that is different from where the multicast traffic is being received. The reason for this is that the PIM network implements a join decision as to where to send the PIM join independently of a traffic decision as to which first hop router to send the multicast traffic, which can cause a mismatch. First, consider the join decision. The PIM network floods the PIM join originated from the last hop router on one side of the PIM network to a spine router of the PIM network based on a prefix of a multicast source address in the PIM join. When the spine router receives the PIM join, the spine router decides where to send the PIM join.

In an example in which the multicast source is multi-homed to two (ingress) edge routers or PEs that are identi-fied by the (same) prefix, the spine router picks one of the two edge routers randomly and sends the PIM join to the selected edge router. Second, consider the traffic decision. When the multicast source has traffic to send, the multicast cast source randomly picks one of the two multihomed edge routers as an upstream destination for the multicast traffic. The multicast source may select the wrong one of the multihomed edge routers. For example, the join decision may select a first edge router, while the traffic decision selects a second edge router.

BRIEF DESCRIPTION OF THE DRAWINGS

FIG. 2 is a high-level flowchart of an example method of an improved PIM flooding mechanism (PFM) and source discovery (SD) (PFM-SD) with multihoming implemented in the network, according to an example embodiment.

FIG. 6 is a flowchart of another example method of performing the improved PFM-SD with multihoming, according to an example embodiment.

DETAILED DESCRIPTION

Overview

In an embodiment, a method is performed by routers of a network configured to provide connectivity from a multicast receiver to edge routers multihomed to a multicast source of multicast traffic on an Ethernet segment. The method com-prises: creating a limited flood domain in the network for the Ethernet segment, wherein the limited flood domain includes boundary routers of the routers positioned to make a final decision as to which of the edge routers to send a multicast join for the multicast traffic; by the boundary routers, upon receiving a source announcement that announces the multicast source is active on a particular edge router of the edge routers of the Ethernet segment, locally storing information, provided by the source announcement, which includes a multicast address for the multicast source and identifies a link to the particular edge router; and by a boundary router of the boundary routers, upon receiving the multicast join, sending the multicast join to the particular edge router using the multicast address and the link.

Example Embodiments

Figure 1:
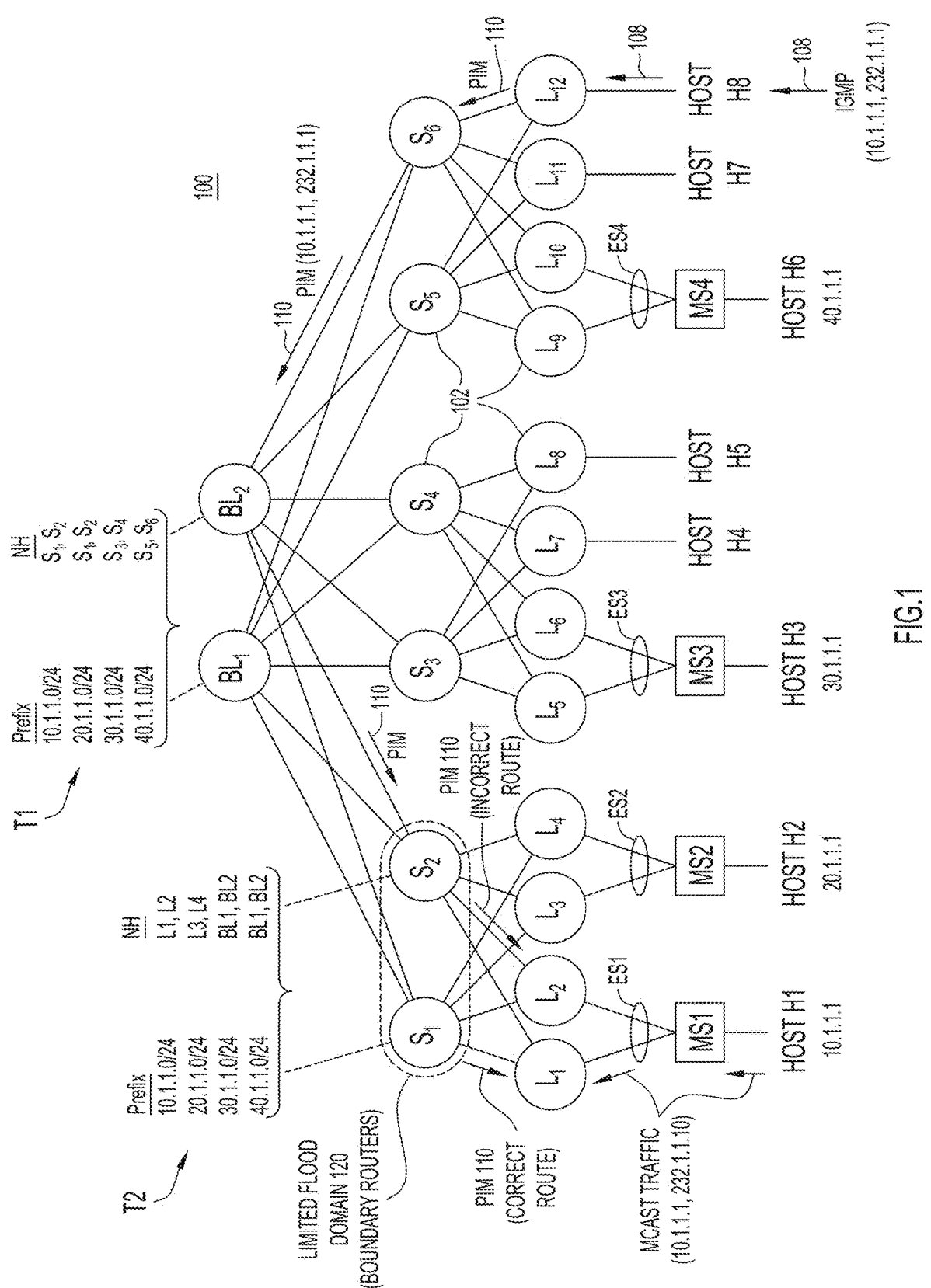
FIG. 1 is a block diagram of a network that incudes multihoming of edge routers on Ethernet segments and in which embodiments presented herein may be implemented, according to an example embodiment.

FIG. 1 is a block diagram of an example network 100 that incudes multihoming of routers on Ethernet segments and in which embodiments presented herein may be implemented. In the example of FIG. 1, network 100 is a protocol independent multicast (PIM) network that implements an improved PIM flooding mechanism (PFM) and source dis-covery (SD) (PFM-SD) with multihoming. Network 100 includes routers 102 interconnected with each other over network links in a multilevel or tiered leaf-spine topology. In network 100, hosts H1-H8 may serve as multicast sources or multicast receivers to exchange multicast traffic with each other over network 100. Network 100 includes top tier or border leaf (BL) routers BL1 and BL2, middle tier or spine routers S1, S2, S3, S4, and S6 each connected to the border leaf routers, and bottom tier leaf or edge routers L1-L12 (also referred to as "provider edge (PE) routers" or simply "provider edges (PEs)"). Edge routers L1-L12 are grouped such that edge routers L1-L4 are each connected to routers S1 and S2, edge routers L5-L8 are each connected to routers S3 and S4, and edge routers L9-L12 are each connected to routers S5 and S6. In the ensuing description, routers and hosts may be referred to simply by their labels or designa-tions. For example, edge router L1 and host H1 may be referred to simply as L1 and H1, respectively.

In the example of FIG. 1, hosts H1, H2, H3, and H6 are multihomed to pairs of edge routers (L1, L2), (L3, L4), (L5, L6), and (L9. L10) configured on Ethernet segments ES1, ES2, ES3, and ES4 (which represent Ethernet segment (ES) identifiers (ESIs) for the Ethernet segments) through multi-homing switches MS1, MS2, MS3, and MS4, respectively. Thus, host H1 operating as a multicast source may send multicast traffic to either of multihomed edge routers L1 and L2 based on a random selection made by multihoming switch MS1, host H2 may send multicast traffic to either of multihomed edge routers L3 and L4 based on a random selection made by multihoming switch MS2, and so on. Hosts H4, H5, H7, and H8 are not multihomed and are only connected to edge routers L7, L8, L11, and L12, respec-tively. Each host Hi may be configured to operate as a multicast source of multicast traffic destined for network

100, or as a multicast receiver to receive multicast traffic from network 100. A multicast traffic flow (also referred to simply as "multicast traffic") is identified by a multicast address (source address (S), group address (G)), as is known. In the example of FIG. 1, Hosts H1, H2, H3, and H6 are configured with addresses 10.1.1.1, 20.1.1.1, 30.1.1.1, and 40.1.1.1, which may be multicast source addresses when the hosts act as multicast sources of multicast traffic. By way of example, addresses referenced herein are Internet Protocol (IP) addresses. It is understood that identifiers other than IP addresses may be used in other examples.

The routers of network 100 implement an improved PFM-SD with multihoming. In part, PFM-SD provides a flooding mechanism by which the routers of network 100 flood multicast source and group information across the network. An example in which conventional PFM-SD is used with multihoming is described briefly as an illustration of problems that can arise using the conventional PFM-SD with multihoming. In the example, on the left side of network 100, host H1 acting as a multihomed multicast source becomes active and originates multicast traffic identified by multicast address (10.1.1.1, 232.1.1.10). Multihoming switch MS1 makes a traffic decision. Specifically, multihoming switch M1 randomly selects, and directs the multicast traffic to, edge router L1 among multihomed edge routers L1 and L2.

On the right side of network 100, host H8 acting as a multicast receiver joins the multicast group to receive the multicast traffic. To do this, the multicast receiver sends to edge router L12 (which is connected directly to host H8) an internet group management protocol (IGMP) join 108 specifying multicast address (10.1.1.1, 232.1.1.10). In response, edge router L12 floods to network 100 a PIM join 110 for the multicast address using PFM. Network 100 floods PIM join 110 based on longest prefix matching (LPM) against source prefix 10.1.1.0/24 in PIM join 110. The term "flood" means to transmit on all connected ports. Therefore, a router that floods PIM join 110 transmits the PIM join from all ports of the router that are connected to other routers (referred to as "adjacent" routers). PIM join 110 floods from the right side to the left side of network 100 via longest prefix matching. Longest prefix matching based flooding by routers BL1, BL2 and S1, S2 makes next hop (NH) decisions based on the prefix and next hop information shown in example prefix-NH tables T1 and T2 in FIG. 1. PIM join 110 arrives at router S2.

Under conventional PFM-SD, router S2 does not know that the multicast source is active specifically on edge router L1. Therefore, router S2 does not know whether to direct PIM join 110 to edge router L1 or edge router L2, and makes a random join decision. In the example, router S2 randomly selects and directs PIM join 110 to edge router L2, which is the wrong router. Thus, the conventional PFM-SD may send PIM join 110 to the wrong edge router (also referred to as a first hop router) due to independent join and traffic decisions. Moreover, the conventional PFM-SD floods the PIM join through the entire network, which can be inefficient and may waste router resources.

Accordingly, embodiments presented herein implement PFM-SD with multihoming that is improved or modified to overcome the above described problems and offer other advantages described below. At a high-level, the improved PFM-SD with multihoming employs a multiphase process that creates a limited Ethernet segment flood domain comprising "boundary routers" configured with specific/exact routing and link information that points directly to a particular edge router of routers that are multihomed on an Ethernet segment and to which a multicast source sends multicast traffic, i.e., on which the multicast source is active. Subsequently, when a multicast join (e.g., a PIM join) for the multicast traffic arrives at a boundary router of the boundary routers via flooding, the boundary router correctly directs the multicast join to the particular edge router on which the multicast traffic is active based on the specific routing and link information. The specific routing and link information is complete or exact, meaning that the particular edge router can send the multicast join directly to the particular edge router without additional routing or link information, and without using longest prefix matching, which does not provide an exact route. In addition, the boundary router prevents further flooding of the PIM join. Thus, the embodiments limit flooding to the limited Ethernet segment flood domain and correctly match the multicast join to the particular edge router that should receive the multicast join.

In the example of FIG. 1, the improved PFM-SD with multihoming creates/designates a limited Ethernet segment flood domain 120 (also referred to simply as a "limited flood domain") for Ethernet segment ES1 comprising routers S1 and S2 each configured with locally stored routing and link information pointing directly to (multihomed) edge router L1 on which the multicast traffic is active. Subsequently, when PIM join 110 arrives at either of the boundary routers (e.g., boundary router S2), the boundary router correctly directs PIM join 110 directly to edge router L1 based on the routing and link information, without flooding, and stops further flooding of the PIM join.

The routers of network 100 also implement network-based techniques by which the routers discover each other and determine path costs to each other. For example, the routers may implement any known or hereafter developed protocols (e.g., IGMP) by which the routers discover each other, compute the path costs, and store the path costs locally (i.e., each router stores path costs leading from the router to other routers). The routers employ the path costs to implement the improved PFM-SD with multihoming, as described below.

FIG. 2 is a high-level flowchart of an example method 200 of the improved PFM-SD with multihoming. The improved PFM-SD with multihoming may be implemented in multiple sequential phases. A first phase (phase 1) creates a limited flood domain (which may also be referred to as an "Ethernet segment decision boundary") in network 100 comprising boundary routers for an Ethernet segment that includes multihomed edge routers. A second phase (phase 2) configures the boundary routers with information that specifies a direct link to a particular edge router on which a (multihomed) multicast source is active. A third phase (phase 3) directs a PIM join for the multicast source to the particular edge router and limits flooding of the multicast join.

At 202, phase 1 creates the limited flood domain (e.g., limited flood domain 120) in network 100 for an Ethernet segment (e.g., ES1) on which edge routers (e.g., edge routers L1, L2) are multihomed to a host (e.g., host H1), which may act as a multicast source of multicast traffic. The limited flood domain comprises designated boundary routers (e.g., routers S1, S2) that are in a "best" position to direct a (subsequent) multicast join (e.g., PIM join 110) for the multicast traffic originated on the Ethernet segment to a particular edge router of the edge routers that are multihomed on the Ethernet segment. In an example, being in the "best" position means having lowest cost reachability (i.e., lowest path cost) to the edge routers. The limited flood domain is the Ethernet segment decision boundary at which the boundary routers are positioned to make final exact decisions as to where to direct the multicast join. Each boundary router represents a position in the topology of network 100 where a path to the edge router does not diverge.

Phase 1 begins when the edge routers are configured as multihomed routers on the Ethernet segment, and discover each other as multihomed peers. When a first edge router of the multihomed routers discovers a peer (e.g., a second edge router of the multihomed routers) on the Ethernet segment, the first edge router creates a new type of PFM-SD message, referred to as an "ES announcement," and floods the ES announcement into network 100. The ES announcement announces the Ethernet segment for the multihomed routers. The ES announcement is configured to cause all routers to which the ES announcement is flooded (referred to as "flooded" routers) to (i) exchange with each other, via the ES announcement (or modified versions thereof), respective path costs leading from the flooded routers to the peer (e.g., to the second edge router of the multihomed routers), (ii) compare the respective path costs, and (iii) designate selected ones (i.e., some, but not all) of the flooded routers as boundary routers for the announced Ethernet segment. Phase 1 ends when the limited flood domain has been created and the boundary routers for the Ethernet segment have been designated.

At 204, phase 2, which follows phase 1, starts when a multicast source (e.g., host H1) becomes active on a particular edge router (e.g., edge router L1) of the multihomed routers of the Ethernet segment announced in phase 1. When the multicast source becomes active on the particular edge router, the particular edge router floods towards network 100 a source announcement that advertises the Ethernet segment, i.e., includes the ESI of the Ethernet segment. The source announcement also includes a multicast address (S, G) of multicast traffic originated by the multicast source, an address of the particular edge router on which the multicast source is active, and link information (e.g., including port identities) that specifically identifies a direct link to the particular edge router on which the multicast source is active. The particular edge router floods the source announcement to the boundary routers in the limited flood domain of the Ethernet segment.

Upon receiving the source announcement, the boundary routers locally store the information provided in the ES announcement, including the ESI for the Ethernet segment and the link information that specifically identifies the link to the particular edge router on which the multicast source is active, so that the boundary routers know specifically where to direct a subsequent multicast join for the multicast traffic, without having to access other routing information. The boundary routers also flood the source announcement. When the source announcement arrives at non-boundary routers, the non-boundary routers reject the source announcement and do not flood the source announcement any further. Therefore, flooding of the source announcement is limited to the limited flood domain. At this point, phase 2 is complete.

At 206, phase 3, which follows phase 2, starts when a third edge router (e.g., edge router L12) receives an IGMP join for the multicast traffic from a multicast receiver (e.g., H8). In response, the third edge router floods a PIM join (e.g., PIM join 110) to network 100. Network 100 floods the PIM join using longest prefix matching until the PIM join arrives at a boundary router (e.g., router S1) among the boundary routers. Configured with locally stored information established in phases 1 and 2, the boundary router specifically directs the multicast join to the particular edge router (e.g., edge router L1) on which the multicast source is active based on the multicast address in the PIM join, the ES1, and the link information. Boundary routers that receive the PIM join do not flood the PIM join further, and thus limit such flooding.

Phases 1, 2, and 3 are described in further detail below with reference to specific examples.

Figure 3:
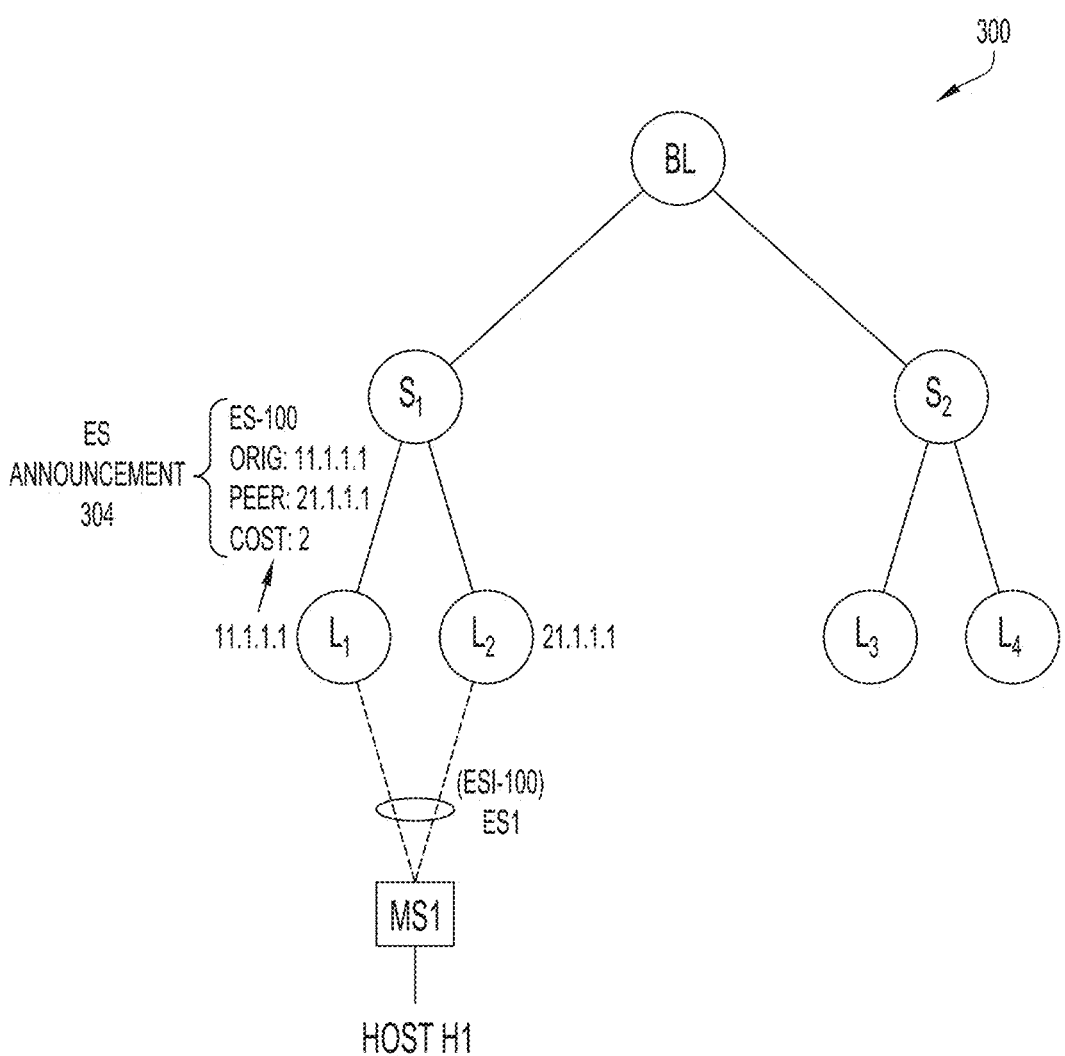
FIG. 3 is an illustration of a network segment of the network useful for describing a first operation of a first phase of the improved PFM-SD with multihoming, according to an example embodiment.

Phase 1. The first phase includes two operations described below in connection with FIGS. 3 and 4. FIG. 3 is an illustration of a network segment 300 of network 100 useful for describing a first operation of the first phase. The first operation is also referred to as "ES announcement." Network segment 300 includes edge routers L1 and L2 multihomed to host H1 on Ethernet segment ES1, as described above. In the example of FIG. 3, edge routers L1 and L2 have respective addresses 11.1.1.1 and 21.1.1.1. When edge router L1 detects edge router L2 as a multihomed peer, edge router L1 creates an ES announcement 304 and floods the ES announcement toward/into network 100 (which is referred to as an "initial" flood) with the intent to create a limited flood domain for Ethernet segment ES1. Similarly, when edge router L2 detects edge router L1 as a multihomed peer, edge router L2 creates/originates an ES announcement (not shown) similar to ES announcement 304 and floods the ES announcement toward/into network 100. A description of the initial flood and router processing associated with ES announcement 304 created by edge router L1 shall suffice for router processing associated with the ES announcement created by L2, which is similar to the former.

ES announcement 304 includes the following information:

a. ESI (e.g., ES1): The ESI may be a user configured value per Ethernet segment, e.g., ESI=100.

b. Originator address ("ORIG") (e.g., 11.1.1.1): An address of a current router that is currently in possession of the ES announcement. The originator address changes or is updated as the ES announcement propagates along the routers hop-by-hop from a previous router to the current router, and then to a next router.

c. Peer address ("PEER") (e.g., 21.1.1.1): An address of the multihomed peer (e.g., L2) of the multihomed edge router (e.g., edge router L1) that created the ES announcement.

d. Peer cost ("COST") (e.g., 1): A path cost (e.g., an internet gateway protocol (IGP) cost) from the current router to the multihomed peer. In the example of FIG. 3, the cost is a number of links that are traversed from the current router/originator router to the peer. Other types of costs are possible.

Figure 4:
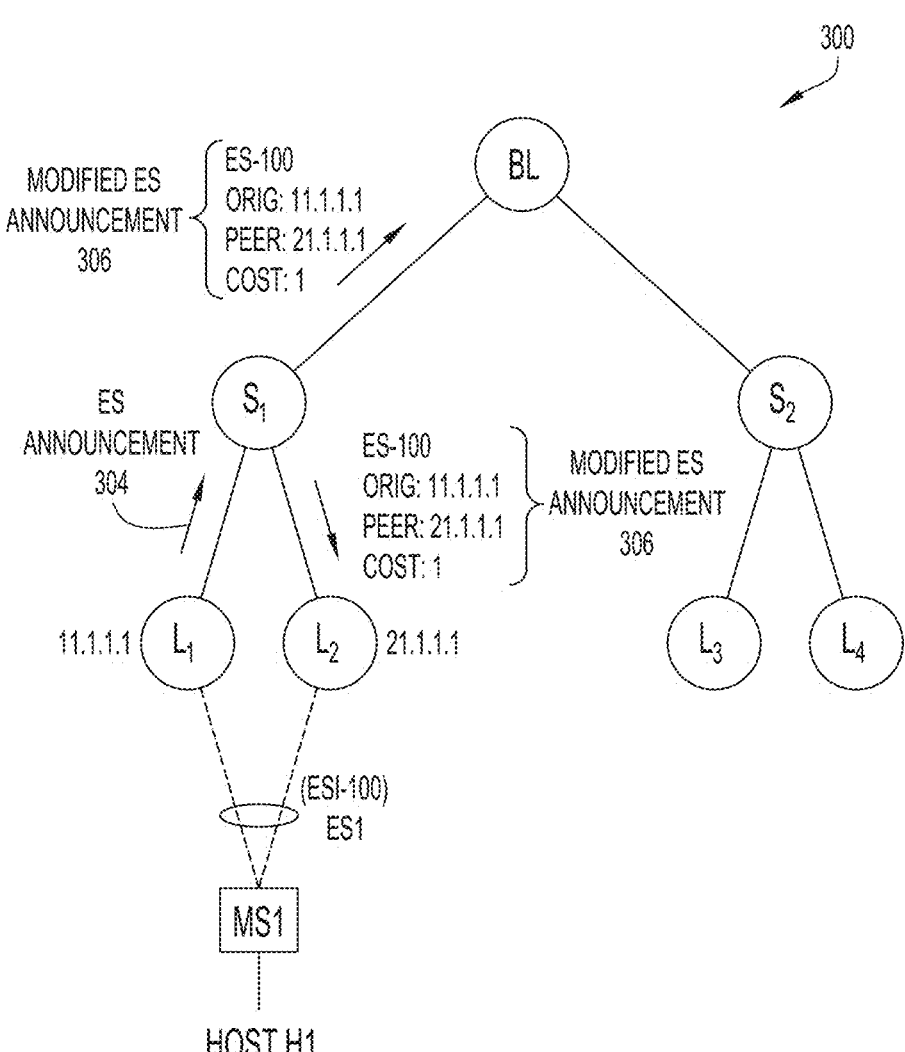
FIG. 4 is an illustration of the network segment useful for describing a second operation of the first phase, according to an example embodiment.

FIG. 4 is an illustration of network segment 300 useful for describing a second operation of the first phase that follows the first operation described above in connection with FIG. 3. The second operation includes router processing of ES announcement 304 (and modified versions thereof) after the initial flood. Router S1 (referred to as the "current" router) receives ES announcement 304 from edge router L1 (which is the "previous" router with respect to S1) and determines whether to process the ES announcement or drop the ES announcement (i.e., reject the ES announcement, without further processing). To determine whether to process ES announcement 304 or reject the ES announcement, router S1 performs the following:

a. Router S1 determines whether the previous cost carried by the ES announcement (which is the cost from previous edge router L1 to the peer L2) is greater than a local or current cost from router S1 to peer L2) (e.g., by comparing the previous cost against the current cost), and performs a next operation (a) or (b) based on results of the determine/compare operation.

b. When the compare indicates that the current cost is greater than the previous cost, then router S1 drops/ rejects the ES announcement, and the ES announce- ment is flooded no further. In this case, router S1 may designate itself as a non-boundary router.

c. When the current cost is not greater than the previous cost, then router S1 accepts the ES announcement and performs the following operations:

i. Router S1 designates itself as a boundary router for the Ethernet segment identified in the ES announce- ment (e.g., router S1 sets a boundary router flag stored in local memory to a value that indicates that router S1 is a boundary router) and stores the ESI from the ES announcement in association with the boundary router flag.

ii. In the ES announcement, router S1 overwrites/ updates (e.g., replaces) the originator address and the previous cost with the address of router S1 and the local/current cost, to produce a modified/updated version of the ES announcement.

iii. Router S1 floods the ES announcement as modified to the network.

In the example of FIG. 4, edge router L1 has a cost=2 to peer L2, while router S1 has a cost=1 to peer L2. Thus, the cost from router S1 to peer L2 is less than the cost with which the ES announcement arrived. Accordingly, router S1 accepts the ES announcements, marks itself as a boundary router for Ethernet segment ES1, updates the ES announce- ment with the address of router S1 and the cost of router S1 to peer L2, and floods the ES announcement as modified (e.g., floods an ES announcement 306).

Router BL1 receives the (modified) ES announcement 306 flooded by router S1 and performs the same general processing as router S1; however, in this case, the local/ current cost=2 from router BL1 to peer L2, which is greater than the previous cost=1 from router S1 to peer L2 with which the ES announcement arrived. Accordingly, router BL1 rejects the ES announcement 306 without further processing. Router BL1 does not mark itself as a boundary router (i.e., router BL1 is a non-boundary router) and does not flood the ES announcement 306 further. Router BL1 may designate itself as a non-boundary router for the Ethernet segment. The fact that the cost from router BL1 to peer L2 is greater than the cost from router S1 to peer L2 is an indication that the ES announcement is crossing a limited flood domain boundary of the Ethernet segment, router BL1 is immediately outside of that boundary, and the ES announcement should not be flooded further.

Phase 2. As mentioned above, the second phase is trig- gered after phase 1 creates the limited flood domain for the Ethernet segment, and when a multicast source becomes active on a particular edge router of the multihomed routers for the Ethernet segment. An example of phase 2 is described with reference again to FIG. 1, in which edger router L1 is the particular edge router on which multicast source H1 is active on Ethernet segment ES1. Upon detect- ing that multicast source H1 is active on Ethernet segment ES1 (and the multicast source is sending multicast traffic to edge router L1), edge router L1 creates a source announce- ment and floods the same to network 100 using PFM. The source announcement includes (i) the multicast address (S, G) for the multicast traffic, (ii) the ESI (e.g., ES1) for the Ethernet segment, and (iii) link information that specifically identifies the connection to the edge router L1 (e.g., the particular edge router that created the source announce- ment). Edge router L1 floods the source announcement to network 100.

When a router flooded by the source announcement receives the source announcement, the router determines whether it is a boundary router for the Ethernet segment having the ESI (e.g., ES1) carried in the source announce- ment. For example, the router determines whether it is designated as a boundary router, i.e., whether its local boundary flag is set to the value that indicates that the router is a boundary router, and whether the local boundary flag is associated with the ESI.

When the router is a boundary router (e.g., router S1) for the Ethernet segment (e.g., ES1) indicated in the source announcement, the boundary router:

a. Stores the multicast address, the ESI, and the specific link information to the particular edge router (e.g., edge router L1) in a local routing table that associates the aforementioned parameters to each other. When a sub- sequent multicast join for the multicast traffic on the Ethernet segment is received by the boundary router, the boundary router will access the locally stored information to direct the subsequent multicast join to the particular edge router (e.g., L1) that created the source announcement and on which the multicast source is active.

b. Floods the source announcement in network 100.

On the other hand, when the router is not a boundary router, the router drops the source announcement, which limits flooding the source announcement and soring of information in the source announcement to the limited flood domain.

At the end of phase 2, all of the boundary routers (and only the boundary routers) have specific link information leading to the particular edge router (e.g., edge router L1).

Phase 3. Phase 3 uses the boundary router configurations established by phases 1 and 2. Phase 3 is described by way of example with reference again to FIG. 1. As mentioned above phase 3 starts when edge router L12 receives IGMP join 108 for multicast traffic originated by multicast source H1, active on edge router L1. In response, edge router L12 floods PIM join 110 to network 100 using PFM. PIM join 110 arrives at boundary router S1 for Ethernet segment ES1. Boundary router S1 specifically directs PIM join 110 to edge router L1 on which the multicast source is active based on the multicast address asserted by PIM join 110, the ESI, and the link information stored locally. Boundary routers that receive PIM join 110 do not flood the PIM join further, and thus limit such flooding.

Figure 5:
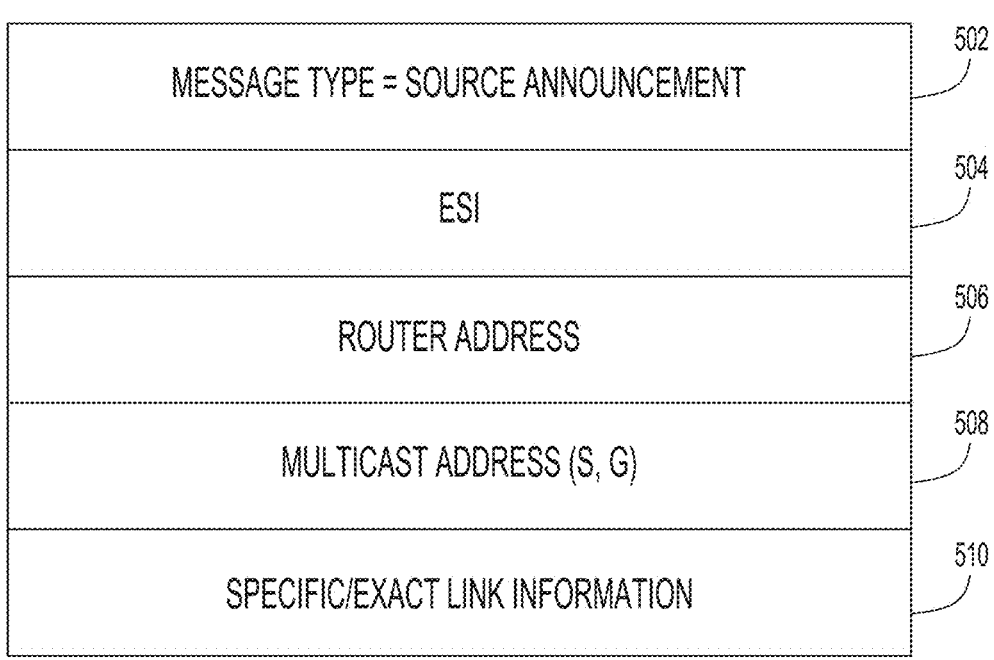
FIG. 5 is an illustration of a source announcement employed in a second phase of the improved PFM-SD with multihoming, according to an example embodiment.

FIG. 5 is an illustration of an example source announce- ment 500. Source announcement 500 includes a message type field 502 that indicates "source announcement." Source announcement 500 further includes an ESI 504, an address 506 of a router flooding the source announcement, a mul- ticast address (S, G) 508, and link information 510 identi- fying a link and/or port for the router that created the source announcement.

FIG. 6 is a flowchart of another example method 600 of performing the improved PFM-SD with multihoming. Operations of method 600 are described above.

At 602, routers of a network, configured to provide connectivity from a multicast receiver to edge routers mul- tihomed to a multicast source of multicast traffic on an Ethernet segment, create a limited flood domain for the Ethernet segment. The limited flood domain includes bound- ary routers positioned to make a final, and complete/exact, decision as to which of the edge routers to send a multicast join for the multicast traffic. The boundary routers may have least cost paths leading to the edge routers, for example. Creating the limited flood domain may include flooding, into the network from the edge routers, ES announcements configured to announce the Ethernet segment and to cause flooded routers among the routers to which the ES announcements are flooded to perform creating the limited flood domain for the Ethernet segment. The flooded routers, via the ES announcements, exchange respective path costs to the edge routers, compare the respective path costs to each other, designate the boundary routers based on results of comparing.

In some embodiments, the flooded routers exchange the ES announcements by propagating an ES announcement of the ES announcements originated at an edge router of the edge routers hop-by-hop from a previous router to a current router of the flooded routers. The ES announcement includes a previous path cost from the previous router to a peer of the edge router. Upon receiving the ES announcement at the current router, the current routers determines whether the previous path cost is greater than a current path cost from the current router to the peer. When the previous path cost is not greater than the current path cost, the current routers designates itself as one of the boundary routers, replaces the previous path cost in the ES announcement with the current path cost, and floods the ES announcement from the current router. On the other hand, when the previous path cost is greater than the current path cost, the current router does not perform any of designating, replacing, and flooding the ES announcement from the current router.

Upon receiving a source announcement that announces the multicast source is active on a particular edge router of the edge routers of the Ethernet segment, at 604, the boundary routers locally store information provided by the source announcement. The information in the source announcement includes an Ethernet segment identifier of the Ethernet segment, a multicast address for the multicast source, and specifically identifies a link to the particular edge router.

Upon receiving the multicast join as a result of the multicast join being flooded through the network using longest prefix matching against a multicast source address in the multicast join, at 606, a boundary router of the boundary routers sends the multicast join to the particular edge router using the multicast address and the link without further flooding of the multicast join.

Figure 7:
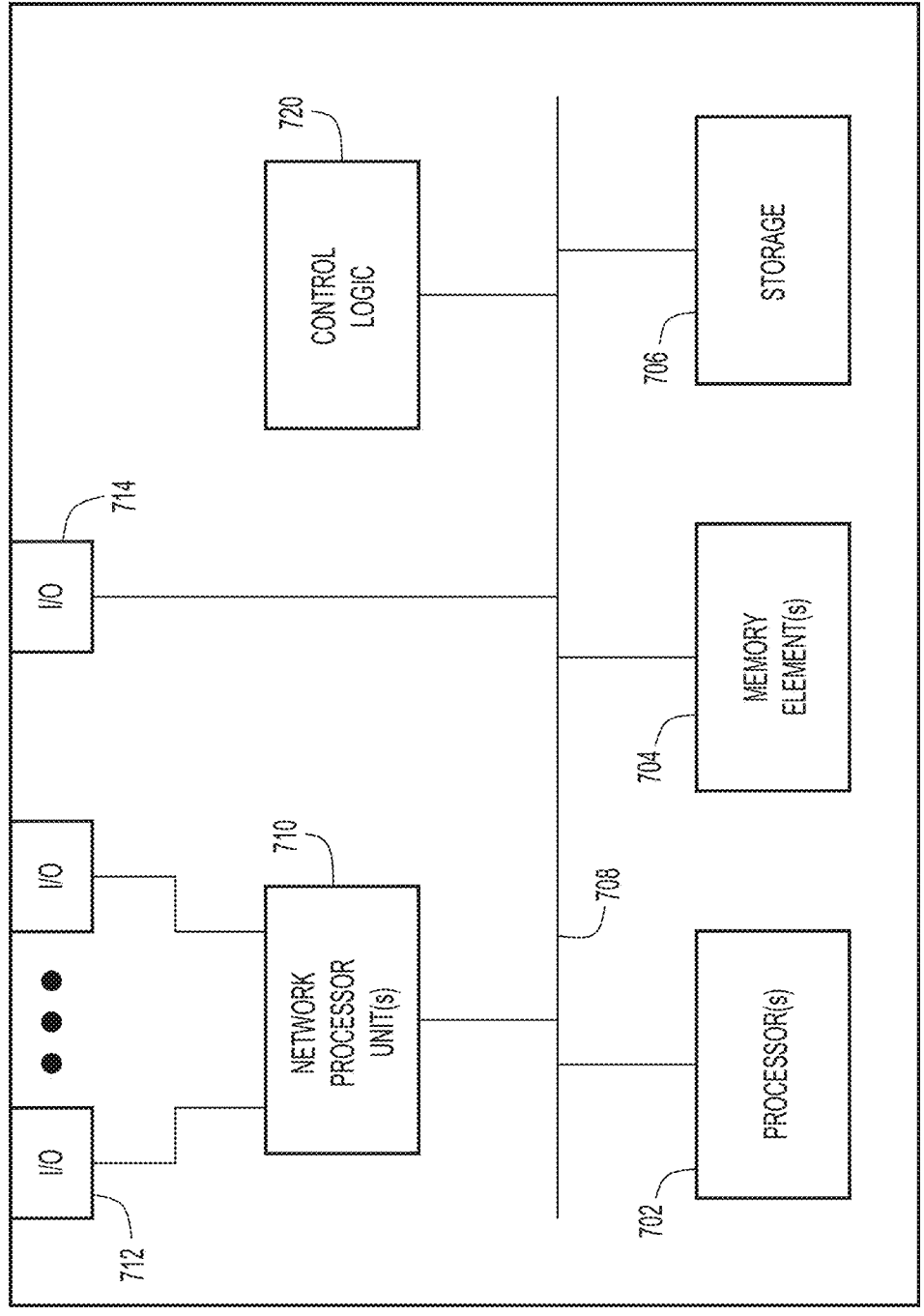
FIG. 7 illustrates a hardware block diagram of a comput-ing device that may perform functions associated with operations discussed herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus, such as computing device 700 or any combination of computing devices 700, may be configured as any entity/entities as discussed for the techniques depicted in connection with FIGS. 1-6 in order to perform operations of the various techniques discussed herein. For example, computing device 700 may represent each of the routers of network 100 and each of the hosts connected to the network.

In at least one embodiment, the computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/ antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including: at routers of a network configured to provide connectivity from a multicast receiver to edge routers multihomed to a multicast source of multicast traffic on an Ethernet segment: creating a limited flood domain in the network for the Ethernet segment, wherein the limited flood domain includes boundary routers of the routers positioned to make a final decision as to which of the edge routers to send a multicast join for the multicast traffic; by the boundary routers, upon receiving a source announcement that announces the multicast source is active on a particular edge router of the edge routers of the Ethernet segment, locally storing information, provided by the source announcement, which includes a multicast address for the multicast source and identifies a link to the particular edge router; and by a boundary router of the boundary routers, upon receiving the multicast join, sending the multicast join to the particular edge router using the multicast address and the link.

In some aspects, the techniques described herein relate to a method, wherein creating the limited flood domain includes: creating the limited flood domain such that the boundary routers have least cost paths leading to the edge routers compared to non-boundary routers of the routers.

In some aspects, the techniques described herein relate to a method, wherein creating the limited flood domain includes: flooding, into the network from the edge routers, Ethernet segment (ES) announcements (ES announcements) configured to announce the Ethernet segment and to cause flooded routers among the routers to which the ES announcements are flooded to perform creating the limited flood domain for the Ethernet segment.

In some aspects, the techniques described herein relate to a method, wherein creating the limited flood domain further includes, by the flooded routers: via the ES announcements, exchanging respective path costs to the edge routers; comparing the respective path costs; and designating the boundary routers based on results of comparing.

In some aspects, the techniques described herein relate to a method, wherein: exchanging includes propagating an ES announcement of the ES announcements originated at an edge router of the edge routers hop-by-hop from a previous router to a current router of the flooded routers, wherein the ES announcement includes a previous path cost from the previous router to a peer of the edge router.

In some aspects, the techniques described herein relate to a method, wherein the method further includes, at the current router: upon receiving the ES announcement, determining whether the previous path cost is greater than a current path cost from the current router to the peer; and when the previous path cost is not greater than the current path cost, designating the current router as one of the boundary routers, replacing the previous path cost in the ES announcement with the current path cost, and flooding the ES announcement from the current router.

In some aspects, the techniques described herein relate to a method, wherein the method further includes, at the current router: when the previous path cost is greater than the current path cost, not performing any of designating, replacing, and flooding the ES announcement from the current router.

In some aspects, the techniques described herein relate to a method, wherein creating the limited flood domain further includes, by the boundary routers: not flooding the ES announcements further to limit flooding the ES announcements to the limited flood domain.

In some aspects, the techniques described herein relate to a method, wherein: receiving the source announcement includes receiving the source announcement to further include an Ethernet segment identifier for the Ethernet segment; and locally storing further includes locally storing the Ethernet segment identifier.

In some aspects, the techniques described herein relate to a method, wherein: receiving the multicast join includes receiving the multicast join as a result of flooding the multicast join through the network to the boundary router using longest prefix matching against a multicast source address in the multicast join, wherein sending includes sending without further flooding of the multicast join.

In some aspects, the techniques described herein relate to a method, wherein the routers operate in accordance with a protocol independent multicast (PIM) flooding mechanism (PFM) and source discovery (SD) (PFM-SD) protocol.

In some aspects, the techniques described herein relate to a system including: routers of a network to provide connectivity from a multicast receiver to edge routers multihomed to a multicast source of multicast traffic on an Ethernet segment, wherein: the routers are configured to perform creating a limited flood domain in the network for the Ethernet segment, wherein the limited flood domain includes boundary routers of the routers positioned to make a final decision as to which of the edge routers to send a multicast join for the multicast traffic; the boundary routers are configured to perform, upon receiving a source announcement that announces the multicast source is active on a particular edge router of the edge routers of the Ethernet segment, locally storing information, provided by the source announcement, which includes a multicast address for the multicast source and identifies a link to the particular edge router; and a boundary router of the boundary routers is configured to perform, upon receiving the multicast join, sending the multicast join to the particular edge router using the multicast address and the link.

In some aspects, the techniques described herein relate to a system, wherein the routers are configured to perform creating the limited flood domain by: creating the limited flood domain such that the boundary routers have least cost paths leading to the edge routers compared to non-boundary routers of the routers.

In some aspects, the techniques described herein relate to a system, wherein the routers are configured to perform creating the limited flood domain by: flooding, into the network from the edge routers, Ethernet segment (ES) announcements (ES announcements) configured to announce the Ethernet segment and to cause flooded routers among the routers to which the ES announcements are flooded to perform creating the limited flood domain for the Ethernet segment.

In some aspects, the techniques described herein relate to a system, wherein the flooded routers are configured to perform creating the limited flood domain by: via the ES announcements, exchanging respective path costs to the edge routers; comparing the respective path costs; and designating the boundary routers based on results of comparing.

In some aspects, the techniques described herein relate to a system, wherein: the flooded routers are configured to perform exchanging by propagating an ES announcement of the ES announcements originated at an edge router of the edge routers hop-by-hop from a previous router to a current router of the flooded routers, wherein the ES announcement includes a previous path cost from the previous router to a peer of the edge router.

In some aspects, the techniques described herein relate to a system, wherein: receiving the multicast join includes receiving the multicast join as a result of flooding the multicast join through the network to the boundary router using longest prefix matching against a multicast source address in the multicast join, wherein sending includes sending without further flooding of the multicast join.

In some aspects, the techniques described herein relate to non-transitory computer readable media encoded with instructions that, when executed by one or more processors of routers of a network configured to provide connectivity from a multicast receiver to edge routers multihomed to a multicast source of multicast traffic on an Ethernet segment, cause the one or more processors to perform: creating a limited flood domain in the network for the Ethernet segment, wherein the limited flood domain includes boundary routers of the routers positioned to make a final decision as to which of the edge routers to send a multicast join for the multicast traffic; by the boundary routers, upon receiving a source announcement that announces the multicast source is active on a particular edge router of the edge routers of the Ethernet segment, locally storing information, provided by the source announcement, which includes a multicast address of the multicast source and identifies a link to the particular edge router; and by a boundary router of the boundary routers, upon receiving the multicast join, sending the multicast join to the particular edge router using the multicast address and the link.

In some aspects, the techniques described herein relate to a non-transitory computer readable media, wherein creating the limited flood domain includes: creating the limited flood domain such that the boundary routers have least cost paths leading to the edge routers compared to non-boundary routers of the routers.

In some aspects, the techniques described herein relate to a non-transitory computer readable media, wherein creating the limited flood domain includes: flooding, into the network from the edge routers, Ethernet segment (ES) announcements (ES announcements) configured to announce the Ethernet segment and to cause flooded routers among the routers to which the ES announcements are flooded to perform creating the limited flood domain for the Ethernet segment.

In some aspects, a method is provided comprising: at routers of a network configured to provide connectivity from a multicast receiver to provider edges that are multihomed to a source of multicast traffic on an Ethernet segment: upon receiving Ethernet segments (ES) announcements (ES announcements) originated by the provider edges and that announce the Ethernet segment, flooding the ES announcements to the network, wherein the ES announcements are configured to cause particular routers of the routers to which the ES announcements are flooded to perform creating a decision boundary for the Ethernet segment, wherein the decision boundary comprises boundary routers among the flooded routers that are in a position to make a final decision as to where to send a multicast join for the multicast traffic after the source is activated on one of the provider edges.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

at routers of a network configured to provide connectivity from a multicast receiver to edge routers multihomed to a multicast source of multicast traffic on an Ethernet segment:

creating a limited flood domain in the network for the Ethernet segment, wherein the limited flood domain includes boundary routers of the routers positioned to make a final decision as to which of the edge routers to send a multicast join for the multicast traffic;

by the boundary routers, upon receiving a source announcement that announces the multicast source is active on a particular edge router of the edge routers of the Ethernet segment, locally storing information, provided by the source announcement, which includes a multicast address for the multicast source and identifies a link to the particular edge router; and by a boundary router of the boundary routers, upon receiving the multicast join, sending the multicast join to the particular edge router using the multicast address and the link.

2. The method of claim 1, wherein creating the limited flood domain includes:

creating the limited flood domain such that the boundary routers have least cost paths leading to the edge routers compared to non-boundary routers of the routers.

3. The method of claim 1, wherein creating the limited flood domain includes:

flooding, into the network from the edge routers, Ethernet segment (ES) announcements (ES announcements) configured to announce the Ethernet segment and to cause flooded routers among the routers to which the ES announcements are flooded to perform creating the limited flood domain for the Ethernet segment.

4. The method of claim 3, wherein creating the limited flood domain further includes, by the flooded routers:

via the ES announcements, exchanging respective path costs to the edge routers;

comparing the respective path costs; and designating the boundary routers based on results of comparing.

5. The method of claim 4, wherein:

exchanging includes propagating an ES announcement of the ES announcements originated at an edge router of the edge routers hop-by-hop from a previous router to a current router of the flooded routers, wherein the ES announcement includes a previous path cost from the previous router to a peer of the edge router.

6. The method of claim 5, wherein the method further comprises, at the current router:

upon receiving the ES announcement, determining whether the previous path cost is greater than a current path cost from the current router to the peer; and when the previous path cost is not greater than the current path cost, designating the current router as one of the boundary routers, replacing the previous path cost in the ES announcement with the current path cost, and flooding the ES announcement from the current router.

7. The method of claim 6, wherein the method further comprises, at the current router:

when the previous path cost is greater than the current path cost, not performing any of designating, replacing, and flooding the ES announcement from the current router.

8. The method of claim 4, wherein creating the limited flood domain further includes, by the boundary routers:

not flooding the ES announcements further to limit flooding the ES announcements to the limited flood domain.

9. The method of claim 1, wherein:

receiving the source announcement includes receiving the source announcement to further include an Ethernet segment identifier for the Ethernet segment; and locally storing further includes locally storing the Ethernet segment identifier.

10. The method of claim 1, wherein:

receiving the multicast join includes receiving the multicast join as a result of flooding the multicast join through the network to the boundary router using longest prefix matching against a multicast source address in the multicast join, wherein sending includes sending without further flooding of the multicast join.

11. The method of claim 1, wherein the routers operate in accordance with a protocol independent multicast (PIM) flooding mechanism (PFM) and source discovery (SD) (PFM-SD) protocol.

12. A system comprising:

routers of a network to provide connectivity from a multicast receiver to edge routers multihomed to a multicast source of multicast traffic on an Ethernet segment, wherein:

the routers are configured to perform creating a limited flood domain in the network for the Ethernet segment, wherein the limited flood domain includes boundary routers of the routers positioned to make a final decision as to which of the edge routers to send a multicast join for the multicast traffic;

the boundary routers are configured to perform, upon receiving a source announcement that announces the multicast source is active on a particular edge router of the edge routers of the Ethernet segment, locally storing information, provided by the source announcement, which includes a multicast address for the multicast source and identifies a link to the particular edge router; and a boundary router of the boundary routers is configured to perform, upon receiving the multicast join, sending the multicast join to the particular edge router using the multicast address and the link.

13. The system of claim 12, wherein the routers are configured to perform creating the limited flood domain by:

creating the limited flood domain such that the boundary routers have least cost paths leading to the edge routers compared to non-boundary routers of the routers.

14. The system of claim 12, wherein the routers are configured to perform creating the limited flood domain by:

flooding, into the network from the edge routers, Ethernet segment (ES) announcements (ES announcements) configured to announce the Ethernet segment and to cause flooded routers among the routers to which the ES announcements are flooded to perform creating the limited flood domain for the Ethernet segment.

15. The system of claim 14, wherein the flooded routers are configured to perform creating the limited flood domain by:

via the ES announcements, exchanging respective path costs to the edge routers;

comparing the respective path costs; and designating the boundary routers based on results of comparing.

16. The system of claim 15, wherein:

the flooded routers are configured to perform exchanging by propagating an ES announcement of the ES announcements originated at an edge router of the edge routers hop-by-hop from a previous router to a current router of the flooded routers, wherein the ES announcement includes a previous path cost from the previous router to a peer of the edge router.

17. The system of claim 12, wherein:

receiving the multicast join includes receiving the multicast join as a result of flooding the multicast join through the network to the boundary router using longest prefix matching against a multicast source address in the multicast join, wherein sending includes sending without further flooding of the multicast join.

18. Non-transitory computer readable media encoded with instructions that, when executed by one or more processors of routers of a network configured to provide connectivity from a multicast receiver to edge routers multihomed to a multicast source of multicast traffic on an Ethernet segment, cause the one or more processors to perform:

creating a limited flood domain in the network for the Ethernet segment, wherein the limited flood domain includes boundary routers of the routers positioned to make a final decision as to which of the edge routers to send a multicast join for the multicast traffic;

by the boundary routers, upon receiving a source announcement that announces the multicast source is active on a particular edge router of the edge routers of the Ethernet segment, locally storing information, provided by the source announcement, which includes a multicast address of the multicast source and identifies a link to the particular edge router; and by a boundary router of the boundary routers, upon receiving the multicast join, sending the multicast join to the particular edge router using the multicast address and the link.

19. The non-transitory computer readable media of claim 18, wherein creating the limited flood domain includes:

creating the limited flood domain such that the boundary routers have least cost paths leading to the edge routers compared to non-boundary routers of the routers.

20. The non-transitory computer readable media of claim 18, wherein creating the limited flood domain includes:

flooding, into the network from the edge routers, Ethernet segment (ES) announcements (ES announcements) configured to announce the Ethernet segment and to cause flooded routers among the routers to which the ES announcements are flooded to perform creating the limited flood domain for the Ethernet segment.

* * * * *